US008417856B1

(12) United States Patent
Reich et al.

(10) Patent No.: US 8,417,856 B1
(45) Date of Patent: Apr. 9, 2013

(54) HIGH SPEED SENSOR DATA TRANSFER INTERFACE

(75) Inventors: Alton Reich, Huntsville, AL (US);
Stephen Doherty, New Hope, AL (US);
James E. Shaw, III, Sterling, CT (US)

(73) Assignee: Streamline Automation, LLC, Huntsville, AL (US)

( * ) Notice: Subject to any disclaimer, the term of this patent is extended or adjusted under 35 U.S.C. 154(b) by 951 days.

(21) Appl. No.: 12/496,471

(22) Filed: Jul. 1, 2009

Related U.S. Application Data

(60) Provisional application No. 61/077,907, filed on Jul. 3, 2008.

(51) Int. Cl.
*G06F 13/12* (2006.01)
*G06F 13/38* (2006.01)
*G06F 19/00* (2006.01)
*G01F 17/00* (2006.01)
*G01F 23/00* (2006.01)
*G01F 25/00* (2006.01)
*G01L 7/00* (2006.01)
*G01N 11/00* (2006.01)
*G01C 19/00* (2006.01)
*G01C 25/00* (2006.01)
*G01D 18/00* (2006.01)

(52) U.S. Cl. ............................. 710/69; 702/56; 702/104
(58) Field of Classification Search .................. None
See application file for complete search history.

(56) References Cited

U.S. PATENT DOCUMENTS 6,032,109 A * 2/2000 Ritmiller, III ................. 702/104
6,134,485 A * 10/2000 Tanielian et al. ............... 701/14
6,243,654 B1 * 6/2001 Johnson et al. .................. 702/85

OTHER PUBLICATIONS

Kang Lee, IEEE 1451: A Standard in Support of Smart Transducer Networking, 2000, National Institute of Standards and Technology, http://ieeexplore.ieee.org/stamp/stamp.jsp?tp=&arnumber=848791.*

* cited by examiner

*Primary Examiner* — Kris Rhu
(74) *Attorney, Agent, or Firm* — KIPA AB; Tomas Friend

(57) ABSTRACT

A high speed sensor data transfer interface is described. The interface combines a bridge circuit, carrier voltage source, first order RC high pass filter, reference power supply, Bessel filter, and high-speed analog to digital converter on a single Smart Transducer Interface Module board (STIM) to receive data from sensors. Data from the STIM is transferred to a Network Capable Application Processor (NCAP) having a microprocessor and either a Field Programmable Gate Array or a Complex Programmable Logic Device. The NCAP transfers data to a data exchange network.

18 Claims, 15 Drawing Sheets

DRAWINGS:

STIM / NCAP Interface
Signaling Diagram

FIG. 15
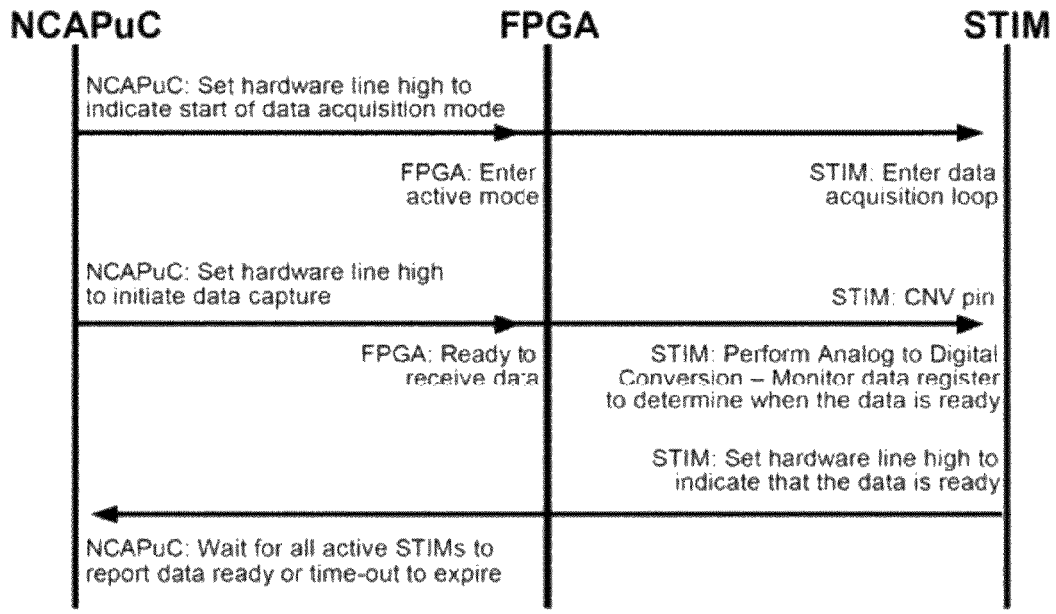
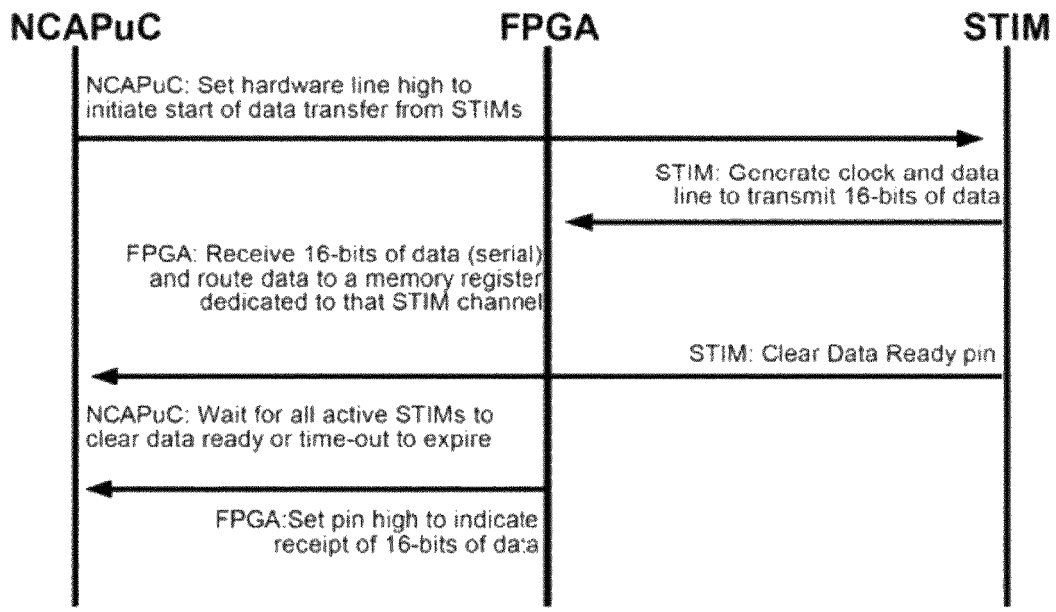

HIGH SPEED SENSOR DATA TRANSFER INTERFACE

CROSS-REFERENCE TO RELATED APPLICATIONS

This application claims priority under 35 U.S.C. 119(e) to US provisional application No. 61/077,907, filed 3 Jul. 2008.

STATEMENT REGARDING FEDERALLY SPONSORED RESEARCH OR DEVELOPMENT

The U.S. Government has certain rights to this invention pursuant to Contract Number FA9101-07-M-0016 and Contract Number FA9101-08-C-0058 awarded by the United States Air Force.

BACKGROUND OF THE INVENTION

1. Field of the Invention

The present invention relates generally to transducing electronic signals from analog sensors into digital output. More specifically, the present invention is a high speed sensor interface that capable of achieving data transfer rates of 50 kHz or more from sensor data arrays to a data storage device. For illustrative purposes, the invention is described using embodiments comprising strain gage sensors. The invention is adaptable, however, for use with any type of sensor having an analog electrical output.

2. Description of Related Art

Sensor measurements are typically gathered and transferred to data storage units by converting an analog signal generated by a sensor to a digital signal that can be received, stored, and processed by a computer. Typically, the analog signal is amplified before being converted to a digital signal. Existing devices and methods for gathering and transmitting sensor data are limited in their data transfer rates and prevents them from functioning to provide sensor data transfer for applications requiring frequent sensor measurements.

For example, turbine engine tests require the measurement of vibrations having frequencies in excess of 20 kHz. Accurate sensor measurements require sensor readings at frequencies at least double those of the vibrations being measured. The present invention overcomes the data transmission rate limitations of existing devices and methods to enable sensor measurements and data transmission rates higher than 40, 60, 70, and 120 kHz.

High speed strain measurements taken during turbine engine testing are currently processed by analog instrumentation that is located outside the test cell. This requires that analog wiring from the strain gages be routed to a patch panel mounted near the engine. Connecting wiring is used that runs from the patch panel, through penetrations in the test cell wall, and to Whetstone Bridge amplifiers located within the test facility. The analog amplifiers may be more than 40 meters from the test cell. The electrical impulses associated with the raw strain gage output have a magnitude of a few millivolts, at most, and the signal is likely to pick up significant amounts of noise along the long cable run. The discrete Whetstone Bridge amplifiers convert the resistance change of the strain gage into a measurable voltage output, and apply a gain to the signal. The output of that analog circuit is further processed through a low-pass filter, which removes the portion of the analog signal that is above a fixed cut-off frequency. In current practice, the analog data is recorded on reel-to-reel tape during testing. During critical portions of the test, a set of analog to digital converters is activated, and the output of specific strain gages is converted to digital data for electronic storage.

Sensor interface modules that comply with the IEEE-1451 standard are used to transduce signals from thermocouples and pressure sensors, for example. Such sensor interface modules, however, support relatively lower data rates, typically less than 1000 samples per second. These data transfer rates are not sufficient to capture data with a resolution required for high frequency vibration measurements, such as those made with strain gages during turbine engine testing.

The present invention combines sensor signal amplification, filtering, processing, and analog to digital conversion in a way that provides improved bandwidth performance and allows the synchronization of the sampling instance of many related sensing nodes. In one embodiment, the present invention is exemplified as an IEEE-1451 compliant on-board, high-throughput 40-channel data acquisition system for turbine engine dynamic strain measurements. The inputs to the system are strain gages with a minimum analog bandwidth of 40 kHz. The system reduces engine installation time and improves the accuracy and dependability of strain measurements over that of existing data acquisition systems. The system may be expanded from 40-channels to more than 200 channels, and may be interfaced with test data storage facilities.

BRIEF SUMMARY OF THE INVENTION

In one aspect, the present invention is a sensor interface that provides for high data transfer rates. In another aspect, the invention is a method for collecting, transducing, and storing analog sensor output data. In yet another aspect, the invention is a system for collecting and storing high speed sensor data. In yet another aspect, the invention is a system for testing turbine engines.

Although the invention is described by way of examples comprising a strain gage sensor, the invention is not limited to such an example. Other types of sensors including, but limited to, thermocouples, chemical sensors, optical sensors, motion sensors, accelerometers, and pressure sensors may be coupled to the present interface.

In one embodiment, the present invention is a Configurable Measurement System comprising high-speed synchronized data acquisition modules. The system comprises a plurality of sensors, a server, a plurality of processors and a plurality of transducer interface modules. The server provides for local storage of data, system control, and a user interface to the system. The processors provide an interface between an ethernet based network and transducer interface modules. Each processor comprises a microprocessor to handle the system control and processor data transmission and an interface processor comprising a logic module that converts multiple, serial data streams to a parallel data output. The transducer modules provide local interface to the strain gages that perform data acquisition, and store information about the interface modules and strain gage in an electronic data sheet.

BRIEF DESCRIPTION OF THE DRAWINGS

FIG. 15 is a diagram showing an example of communication between a server, an NCAP, and a STIM during a data acquisition process.

DETAILED DESCRIPTION OF THE INVENTION

Configurable Dynamic Strain Measurement System Architecture

Figure 1:
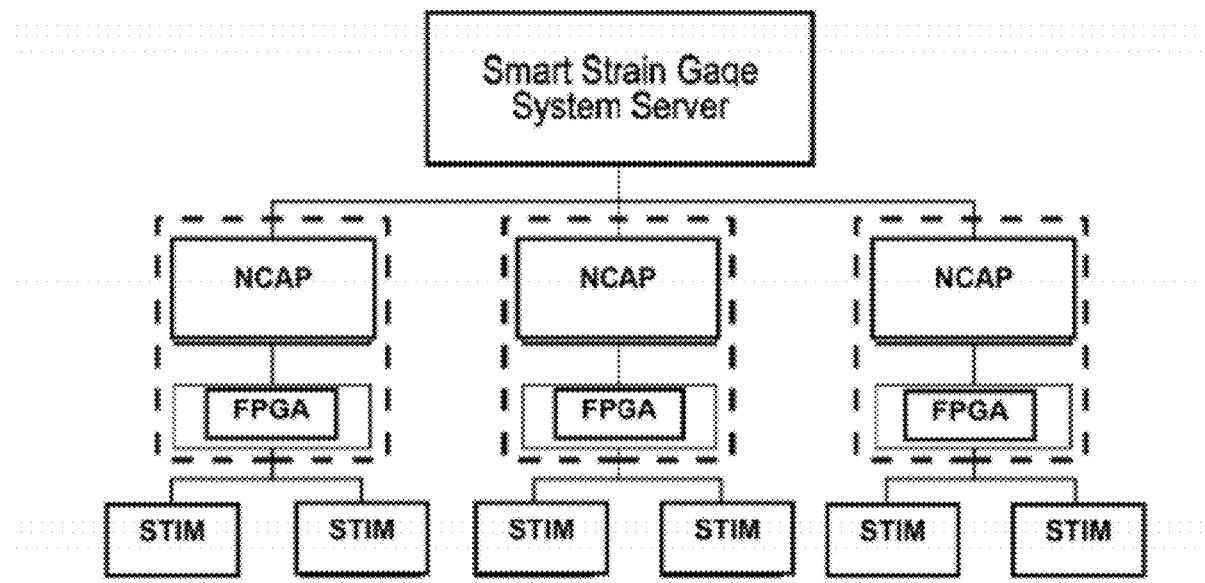
FIG. 1 is a diagram of a Configurable Dynamic Strain Measurement System architecture.

The basic system architecture of a possible embodiment of a high speed sensor data transfer interface is shown in FIG. 1. A Smart Strain Gage System Server provides for local storage of data, system control, and a user interface to the system. A plurality of Network Capable Application Processors (NCAPs) provide an interface between the Ethernet based network and a plurality of Smart Transducer Interface Modules (STIMs). Each NCAP comprises a Field Programmable Gate Array (FPGA) or Complex Programmable Logic Device (CPLD) interface processor, which converts multiple, serial data streams into a parallel data output. Each NCAP is connected to a plurality of STIMs. With the number of STIMs per NCAP being varied according to need, and is preferably between 12 and 24 STIMs per NCAP. Each STIM provides a local interface to a corresponding strain gage that performs data acquisition, and stores information about the STIM and strain gage in a Transducer Electronic Data Sheet (TEDS). Each NCAP comprises a microprocessor to handle the system control and data transmission duties of the NCAP. The microprocessor preferably comprises built-in IEEE-1588 time synchronization and packet time-stamping capabilities, but may use a discrete IEEE 1588 time stamp unit.

Server Application Architecture

Figure 2:
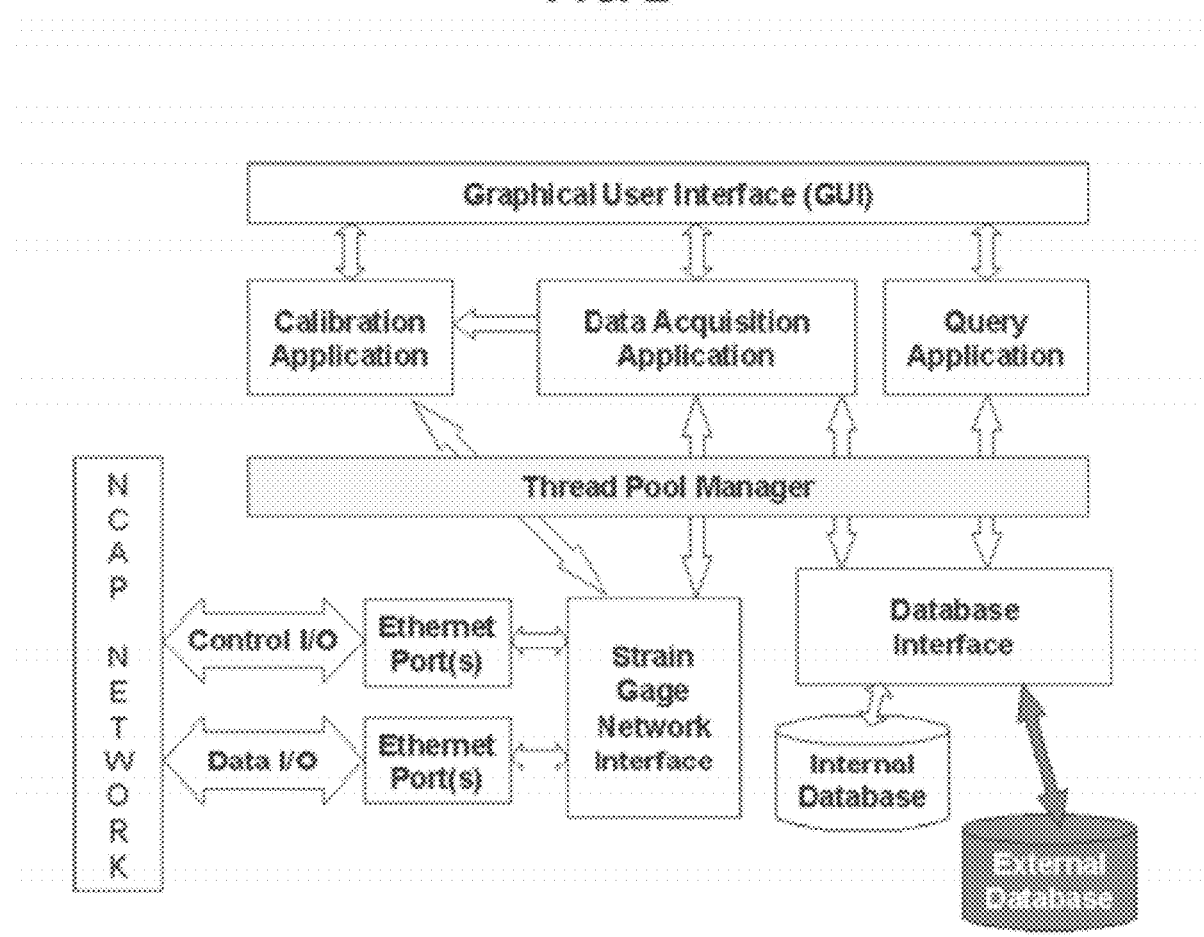
FIG. 2 is a diagram showing a server application architecture.

The server applications may be devised as a suite of separate but interacting components that optimally employ multiple threads of executing that can run concurrently on a single or multi-core machine (FIG. 2). The number of cores contained in the server may be varied and, for example, may be 8 cores contained in two quad-core processors. The number of cores required for a given system may be estimated based upon the expected data rate of strain gage or other sensor data arriving over the sensor network, and the number of concurrent activities that may be required to efficiently accept, format, and store the data. Similarly, the minimum required memory may be varied as required by the server in order to queue incoming data, and for example, may be 8 Gb.

Preferably, the operating system (OS) is one that efficiently uses multi-core processors such as OS Linux. Also, a 64-bit OS, such as some Linux variants and Windows Vista, may be used because of the width of their data buses, which may reduce the time between processing and writing the data to the disk drive. A graphical user interface (GUI) is shown in FIG. 2, but this may be supplemented with a command line interface.

The three main server applications are the Calibration Application, the Data Acquisition Application, and the Query Application. Four common components provide services to the three primary application components: the Strain Gage Network Interface, the Database Interface, the Thread Pool, and the GUI. These components abstract away interface implementation-specific details required for interaction with external systems, and facilitate reuse of code for tasks common across the main applications, such as network communication and database interaction. The Strain Gage Network Interface and the Database Interface provide a generic interface to external systems including the Ethernet connections and the internal and external system databases. The thread pool manages requests for threads on an application priority basis. Preferably, the data acquisition application has the highest priority, and the query application has the lowest. The GUI provides a graphical interface for the user to calibrate and run the data acquisition process, as well as to later query stored data. The GUI preferably runs on the core Strain Gage Server application thread. A local user is provided options such as saving configuration information and exporting query results, or a subset thereof, for engineering analysis.

The Strain Gage Network Interface component creates and manages a connection between the NCAPs and the server applications, and additionally marshals and unmarshals the byte data passed between the NCAPs and server applications. This interface component can also alert the rest of the system if there is a communication error. Transmission Control Protocol (TCP) or User Datagram Protocol (UDP), for example, may be used for communication between the server and the NCAPs.

The server and NCAPs may benefit from an acknowledgement system when setting up communication ports to ensure that all Strain Gage System components in the network are ready to send data. Using this approach, the server sends a message to each NCAP telling it to connect to a data delivery port P. The advantage of this is that it provides flexibility in the network should there be a conflict with another application. Thus, only the server needs to be changed, not each NCAP. Additionally, the server can listen at port P for each NCAP to connect. Thus, it can count the number of NCAPs that have replied and compare it to the expected amount specified in the configuration. In this manner, after a specified time-out, the server can raise an error to the user that there is a problem in the network. Once all NCAPs have reported in, the server knows to begin diverting resources such as threads and disk access, for data acquisition, and then send a control signal for the NCAPs to begin data transmission.

The calibration application provides a graphical interface that allows the user to configure and test the strain gage sensor network. The data acquisition application is responsible for accepting, formatting, and storing data received from the strain gage sensor network. This is the primary application that starts and stops the data collection procedure. It also uses the calibration application to allow the user to calibrate the sensor network prior to the data collection procedure.

Data Acquisition Architecture

Figure 3:
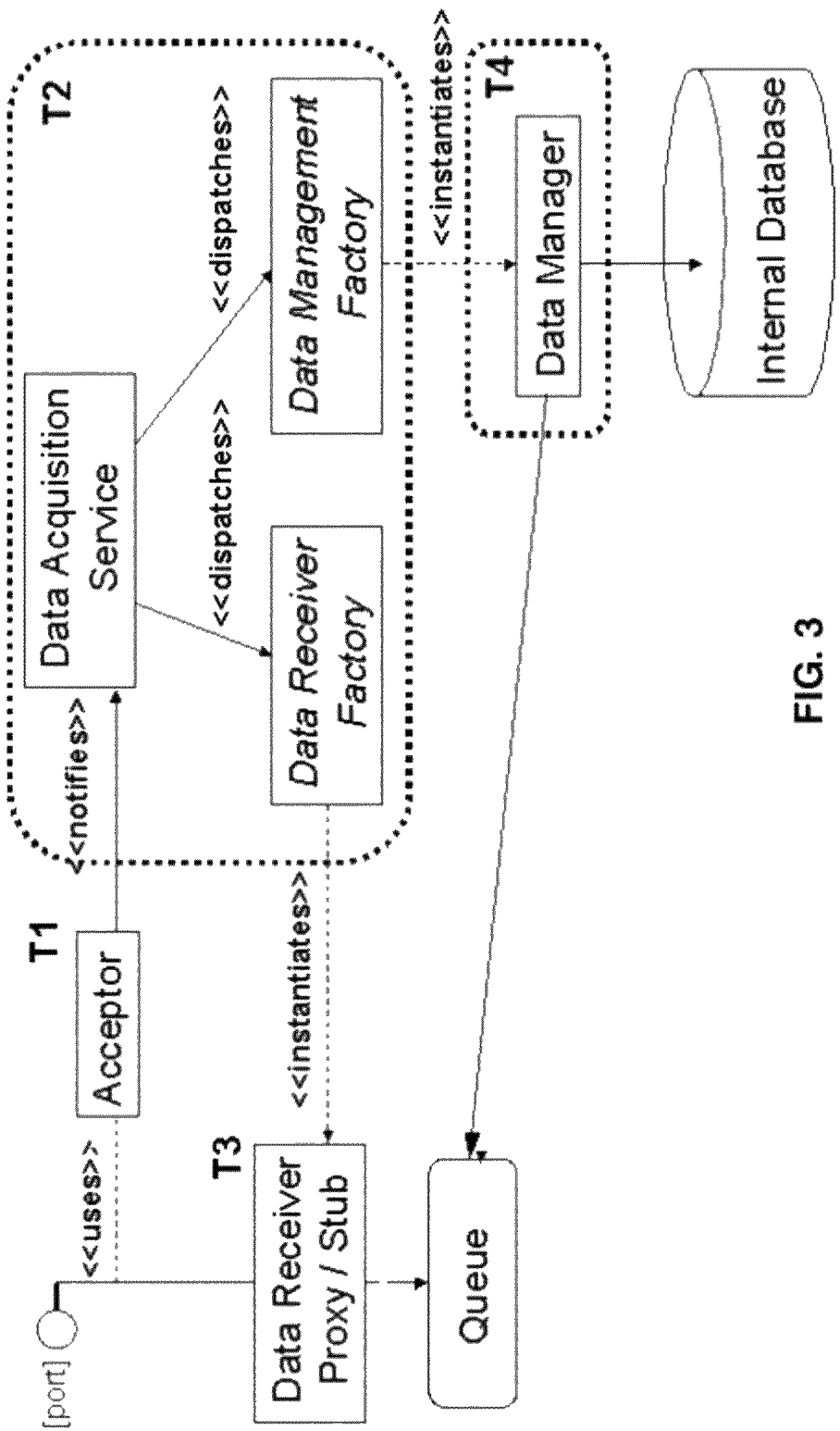
FIG. 3 is a diagram showing a data capture application architecture.

The general architecture of a Data Acquisition Application is shown in FIG. 3. The GUI (not shown) instantiates the Data Acquisition Service. This leads to the creation of the Data Receiver Stub which contacts the NCAPs via a control port and prepares the sensor network for data transmission. Any TCP/IP or UDP communication protocol necessities are handled by the Acceptor. The Data Manager is created by the Data Acquisition Service. Once communication is achieved via a control port, the server and the NCAP open a data port communication channel. The Data Receiver stores data in a queue as it arrives on the data port. The Data Manager retrieves the queued data, processes it, and stores it in the internal database. The T1, T2, T3, and T4 labels represent concurrent threads. Threads T1 and T2, which represent the Acceptor and Data Acquisition Service, respectively, have jobs that are short-lived enough to allow them to manage activities across multiple ports. Threads T3 and T4 are per port and/or per client (i.e., NCAP). This means that if it is decided that each NCAP is provided its own Ethernet card in the server to which it sends data, or that each NCAP is assigned its own port, then there will be a set of threads T3 and T4 per NCAP.

Query Application Architecture

Figure 4:
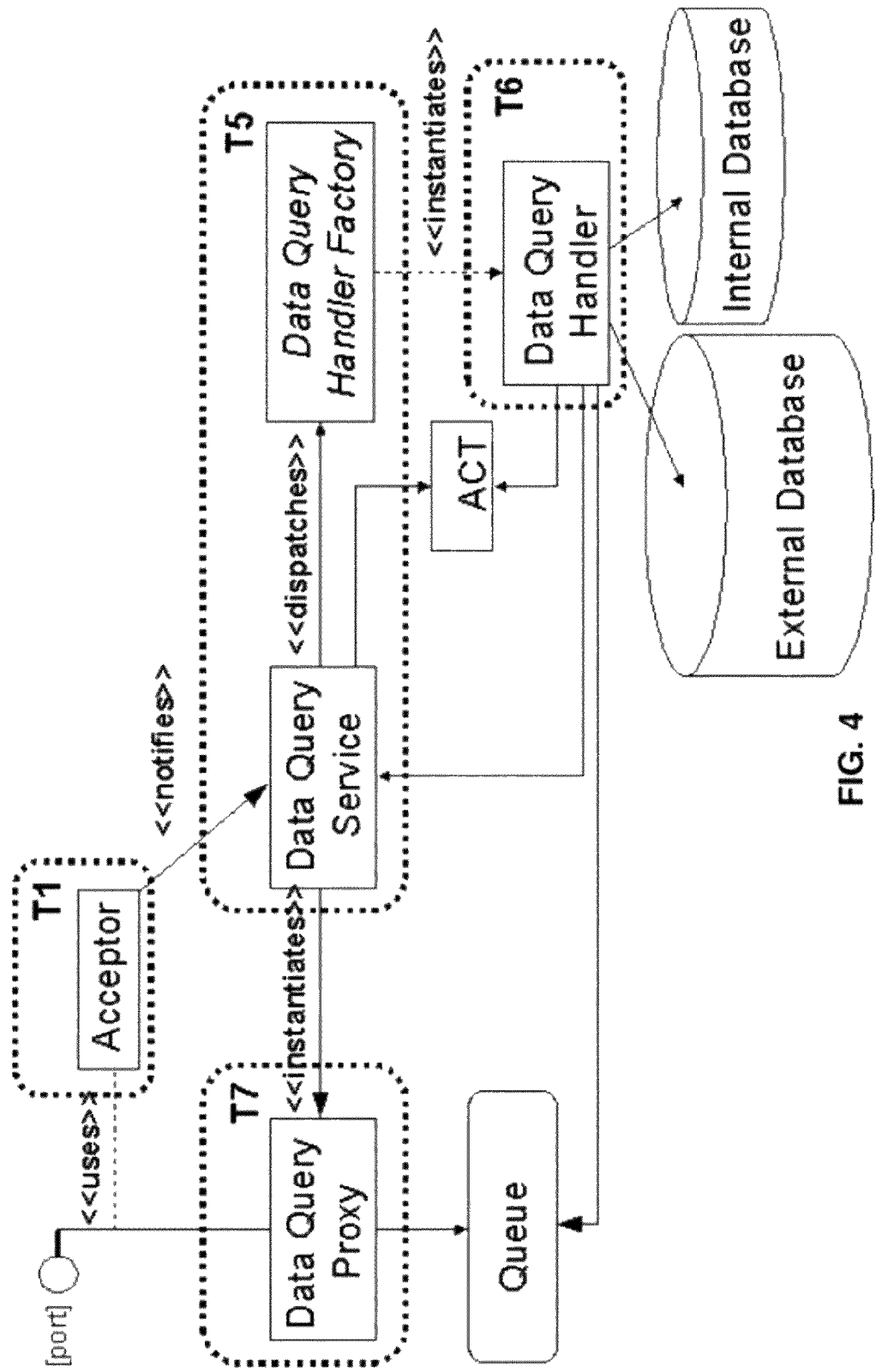
FIG. 4 is a diagram showing the general architecture of a query application.

The general architecture of a Query Application is similar to the data acquisition application is shown in FIG. 4. The T1, T5, T6, and T7 labels represent concurrent threads. A Data Query Service, running in its own thread, is started by the GUI. It, in turn, instantiates a Data Query Handler, also running in its own thread. The data query handler retrieves data and returns it to the GUI for display. This architecture can be extended to incorporate external queries, such as those received via Ethernet connection from a remote site via the Acceptor. A Data Query Proxy is created by the Data Query Service. This proxy operates in its own thread. Similar to the data acquisition architecture, the proxy queues external query requests and a data query handler dequeues the query and processes the requests. Query results are provided to the Data Query Service, which returns them to the Proxy for marshaling and transmission back to the requester. The Data Query Handler may employ its own queue in order to efficiently respond to similar data queries without having to resort to the time and throughput expensive operation of going back to the database, especially if it is external.

Given that multiple requests may arrive simultaneously from internal and external clients, the architecture uses an asynchronous completion token (ACT) to keep track of which client receives which response. Threads T6 and T7 may be instantiated per request, depending on server activity. An alternative to the ACT is to serialize all queries. However, with the addition of an external database whose behavior is unknown, this may lead to lengthly, unwarranted delays in service for local requests. Another alternative is to use a single thread for local requests and another single thread for all external requests.

The internal database uses the Structured Query Language (SQL). Stored data includes TEDS data, data acquired from sensor readings, and any other data about the sensor network that is required to be persistent. TEDS data is preferably in accordance with the appropriate template defined by the IEEE-1451.4 standard. For strain gages Template 35 is used.

The overall system is generally operated in one of three modes: Test Set Up; Pre-Test; and Test. Test Set Up is normally performed well before testing and sets data in TEDS for each STIM, gathers data into server-side data bases using STIM asynchronous data transfer mode. Pre-Test is normally performed just prior to testing and sets NCAP sampling frequency, specifies test start time, and checks NCAPs and STIMs. In Test mode, NCAPS trigger STIM sampling and STIMs send data via synchronous data transfer mode.

Smart Transducer Interface Modules (STIMs)

Figure 5:
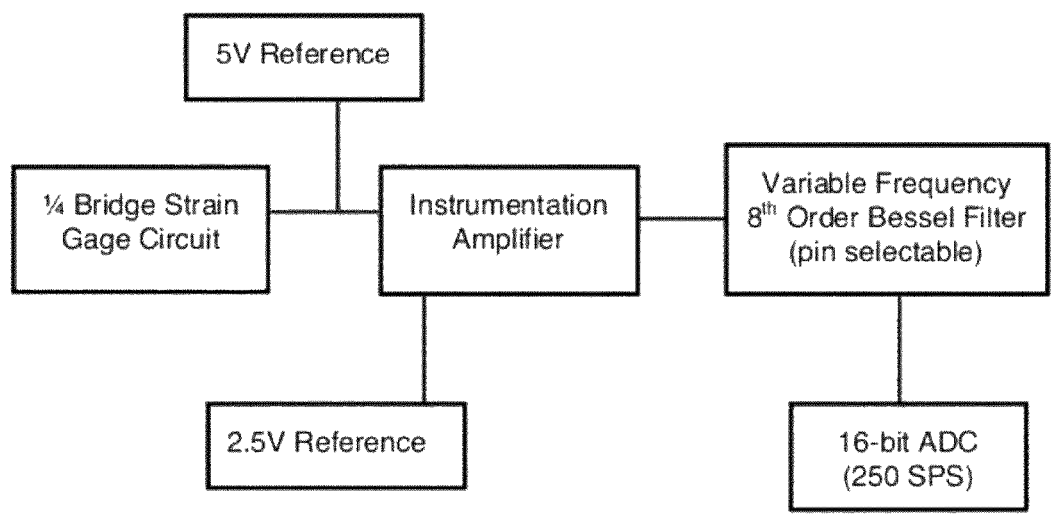
FIG. 5 is a circuit design for one embodiment of a STIM able to connect to any microcontroller with serial communications capabilities.

A circuit design for one possible embodiment of a STIM connected to a microcontroller (not shown) with SPI (serial communications) capabilities is shown in FIG. 5. A bridge circuit converts a resistance change of the strain gage into a voltage that is amplified and measured directly with an analog to digital converter. The strain gage may be, for example, a 2-wire or 3-wire strain gage and a 120 Ohm, 350 Ohm, or any other nominal resistance strain gage. A first order resistor-capacitor (RC) high pass filter is used to "AC-couple" the signal from the strain gage to the input of the instrumentation amplifier. The filter has a cut-off frequency that can be varied by changing the values of a resistor and a capacitor in the filter. This filter effectively passes all of the signal above a selected frequency while eliminating DC offset due to static deflection or temperature changes. A 5 V reference power supply provides an excitation voltage for the bridge circuit and also powers the instrumentation amplifier.

The instrumentation amplifier reads the differential voltage (+/−millivolts) from the bridge circuit, amplifies the output signal, and references the amplified voltage to a voltage set on a reference pin. The gain applied by the instrumentation amplifier is set based on the value of a single resistor external to the amplifier. In this example, a 2.5 V is applied to the reference pin, so the output signal rides on a 2.5 V carrier. This gets the actual time-varying signal above the level of noise and makes it possible to use a single-ended Analog to Digital converter. As an example of instrumentation amplifier function, a 2.5 mV voltage from the bridge circuit would be amplified by 100 to become 250 mV. This would then be referenced to 2.5 V and result in 2.750 V at the output pin of the instrumentation amplifier.

The output from the instrumentation amplifier is fed into an $8^{th}$ order Bessel filter used for anti-aliasing. The STIM uses an integrated Bessel filter chip with a 4-bit pin selectable cut-off frequency. The cut-off frequency can be set in 10 kHz increments between 10 kHz and 150 kHz and may be tied to digital output pins on the STIM microcontroller to enable the cut-off frequency to be a programmable parameter. The output of the Bessel filter chip can be turned off by setting all of the frequency pins to off. The filtered signal is routed to the input of a high-speed (250 kSPS), 16-bit analog to digital converter. This single chip unit digitizes the input voltage and converts it to a 16-bit "number of steps" that is referenced to it's + and − supply voltages. In other words, an input signal voltage that matches that applied to the − supply voltage pin (typically ground) is digitized as 0 steps. An input voltage that matches that applied to the + supply voltage pin is digitized as 65535. Voltages in between are digitized accordingly.

In the strain gage example, a bridge circuit converts the resistance change of the strain gage into a voltage that is amplified and measured directly with an analog to digital converter. STIMS may be adapted to accept signals from other sensor types. For example, any 0 to 10 V output sensors, 4 to 20 mA output sensors, ICP sensors, and thermocouples.

Figure 6:
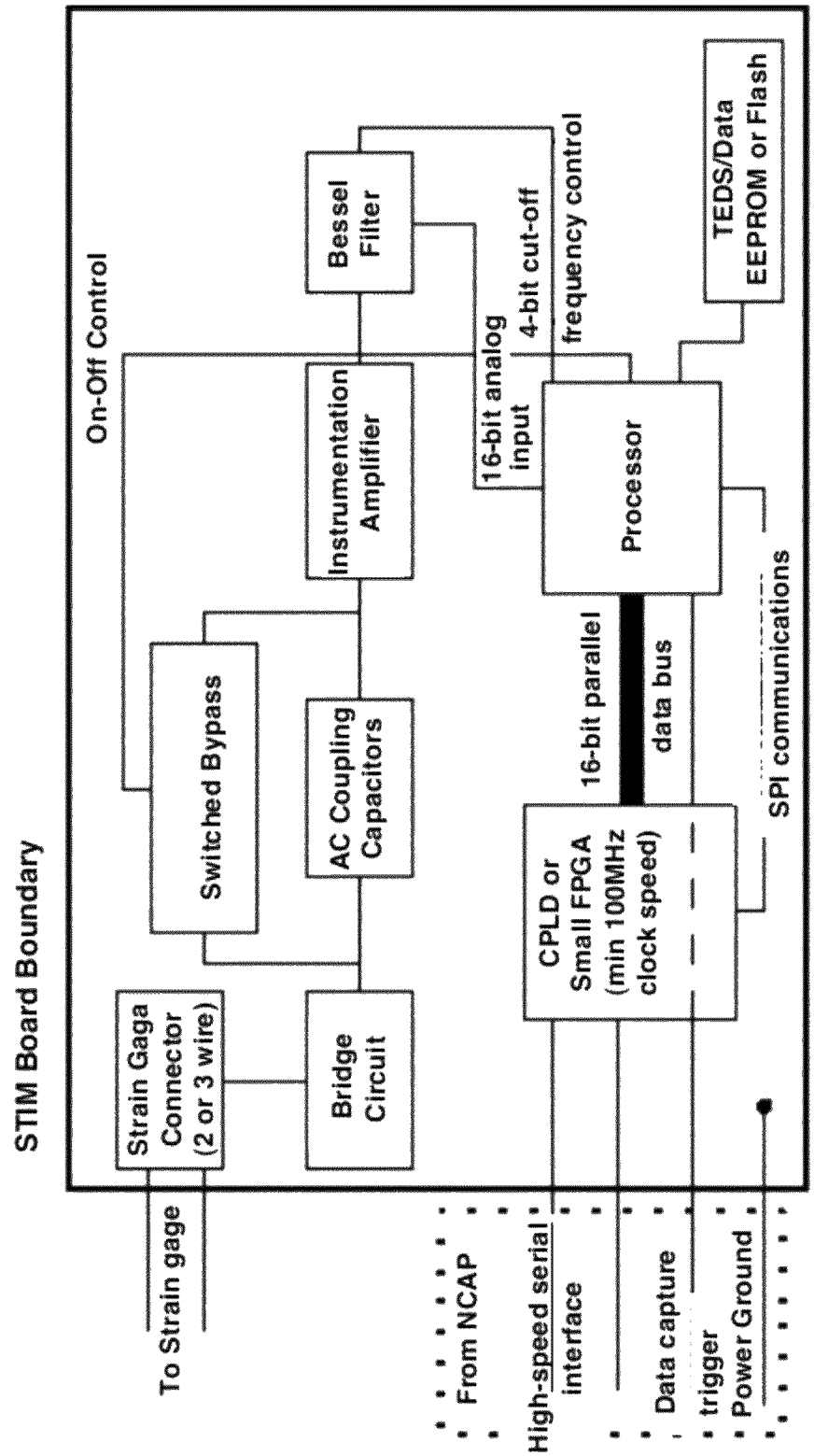
FIG. 6 is a block diagram of an exemplary STIM board.

FIG. 6 shows a block diagram of an exemplary STIM board. The STIM board comprises an embedded microprocessor that contains TEDS information and performs the data acquisition and transfer. In addition to the elements shown in FIG. 5, FIG. 6 shows on/off control, a switched bypass, and connections to a strain gage, an NCAP, a EEPROM or Flash data storage device, and a processor, and a Complex Programmable Logic Device (CPLD) or Field Programmable Gate Array (FPGA) comprising an internal clock connected via a data bus. The STIM board shown in FIG. 6 transmits 80,000 samples per second (SPS) to the NCAP using a STIM processor clock frequency of from 22.5 MHz to 29.3 MHz. The integration of the CPLD into the STIM acts as a high-speed serial interface between the two components and allows data to be transferred from the STIM processor to CPLD via a parallel interface.

Figure 7:
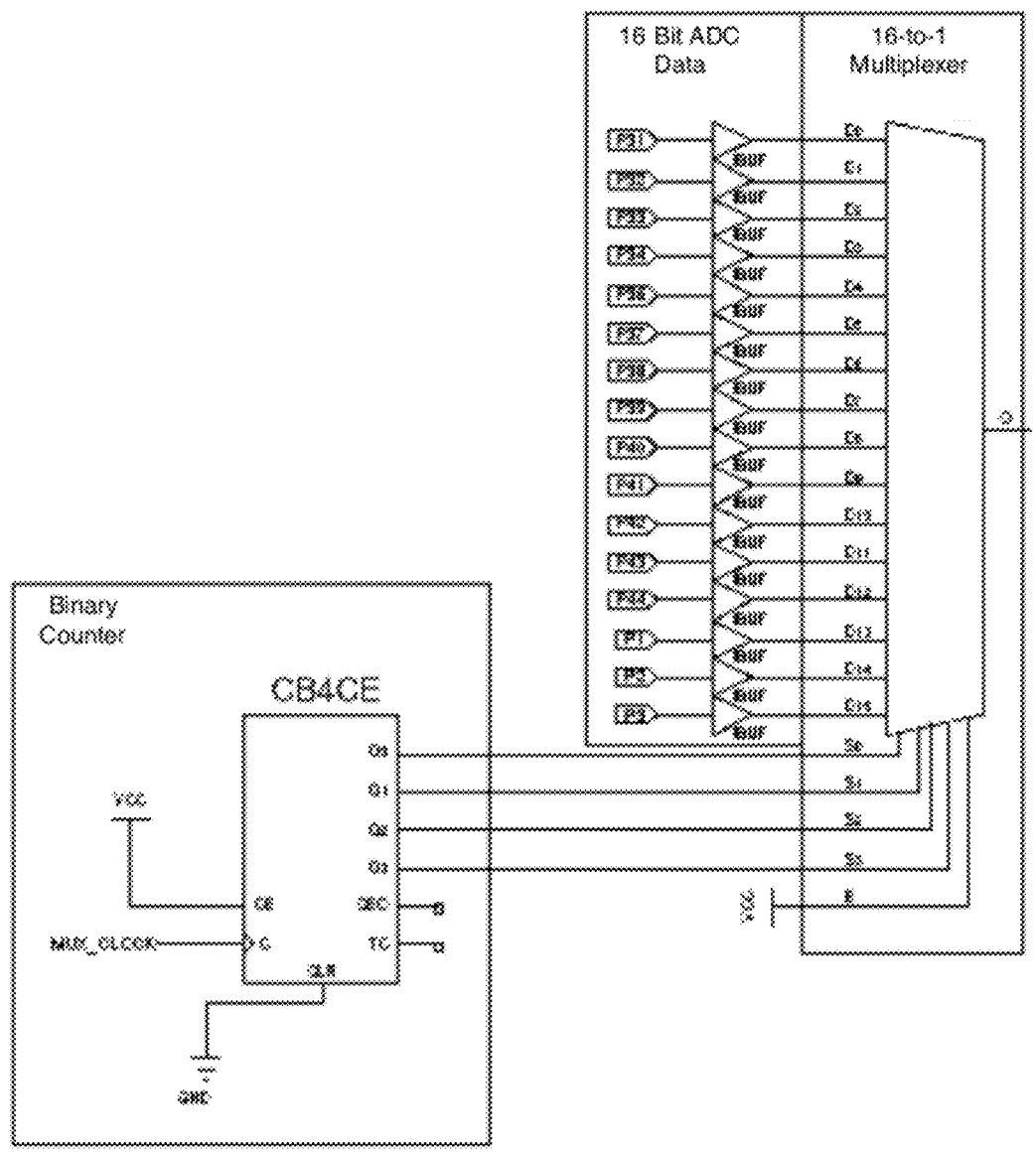
FIG. 7 is a logic schematic for an exemplary CPLD.

An exemplary logic schematic for a CPLD is shown in FIG. 7. The CPLD receives and buffers 16 bits of data in the "16 Bit ADC Data" block. This data is provided to a 16-to-1 multiplexer. An internal 16 MHz clock runs for timing of internal operations, and is used to generate an 8 MHz external clock that is used for clocking out the data to the NCAP. The data is clocked out of the multiplexer to an external serial output one bit at a time, least significant bit first. A 16-bit wide interface allows the data to be transferred in two clock cycles at 25 MHz. An 8-bit wide interface allows the data to be transferred in 5 clock cycles. The CPLD serial interface operating at an 8 MHz clock frequency can support the transfer of 500,000 SPS in the limit.

Network Capable Application Processor (NCAP)

Figure 8:
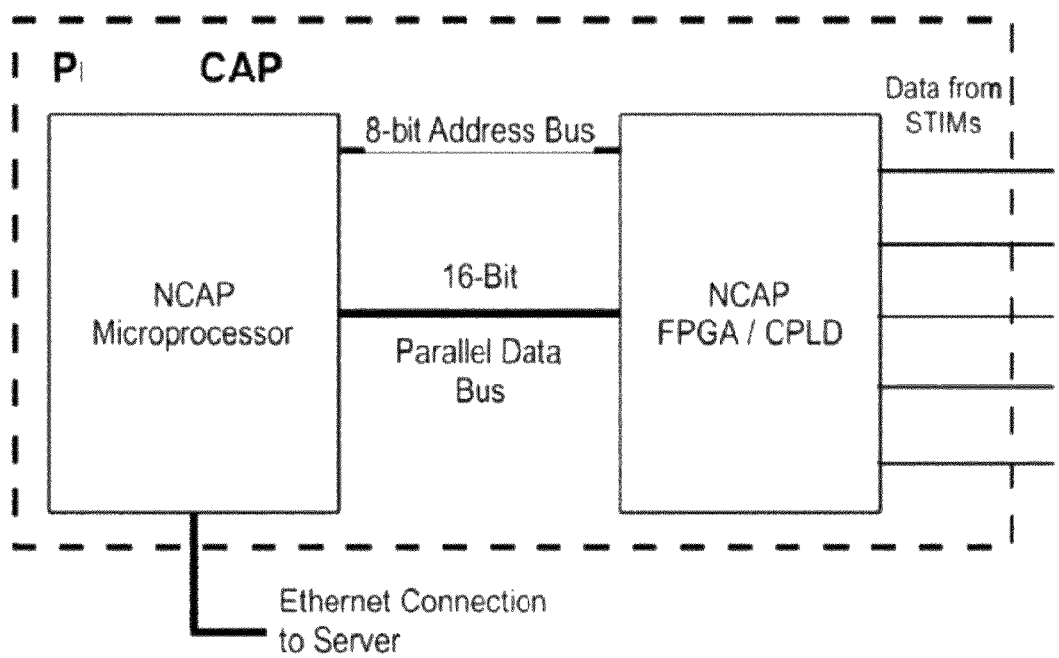
FIG. 8 is a diagram showing an example of a NCAP.

The NCAP comprises a NCAP microprocessor and a FPGA or CPLD (FIG. 8). The NCAP microprocessor can be a discrete processor or integrated into the FPGA, and may be software defined using FPGA logical blocks. The microprocessor interfaces with the STIM processor, transmits data via Ethernet to the server, provides local control of the data acquisition process, and maintains precision time synchronization using the IEEE-1588 precision time protocol. The FPGA/CPLD receives multiple serial data streams from the STIM processors and stores them for access as 16-bit wide addressable memory or other suitable memory.

The NCAP microprocessor has built-in IEEE-1588 precision time protocol capabilities. A range of processors is available with this capability ranging in speed from 50 MHz to 400 MHz. For demonstration purposes a 50 MHz LM3S8962 processor from Luminary Micro® is used in the selected embodiment. The NCAP may be designed to interface with four or more STIMs and to receive parallel data streams and transmit data via an ethernet network to a server. The NCAP may also synchronize with an IEEE time server for precise synchronization.

A NCAP may also comprise first and second discrete circuit boards wherein the first circuit board is provided with a FPGA, and the second circuit board is a differential driver-receiver board. In such a configuration, the differential driver-receiver board serves as an interface board to break out the signals to each STIM.

During operation, the NCAP processor and FPGA/CPLD queries basic TEDS data from connected STIMs and transmits data from the STIMs to the systems server before the start of data acquisition. Time may be synchronized automatically or with an IEEE-1588 master clock. Data acquisition is then triggered on the STIMs. Data is received from the STIMs, is time stamped, and transmitted to the server via ethernet. The STIM processor responds to queries for TEDS data prior to the start of data acquisition. TEDS data may be stored according to Template 35 of the IEEE-1451.4 standard, for example. The use of IEEE-1451 facilitates the simultaneous use of multiple sensors of different types with different capture rates. Data form all of the sensors may be connected to the same network and pass data on a common ethernet cable.

Software on the server enables queries for TEDS data to be generated, responses to be received and displayed, the start of data acquisition, receiving and storing data in a database, and customized queries on the data.

STIM—NCAP Interface

Figure 9:
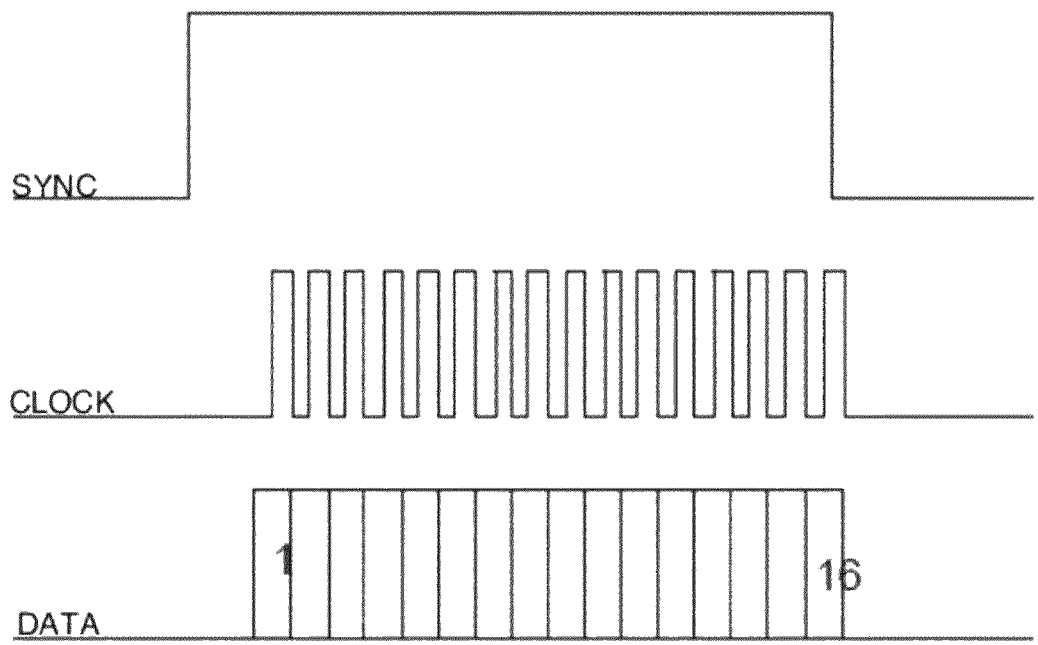
FIG. 9 illustrates high speed synchronous communication mode between a NCAP and a STIM.
Figure 10:
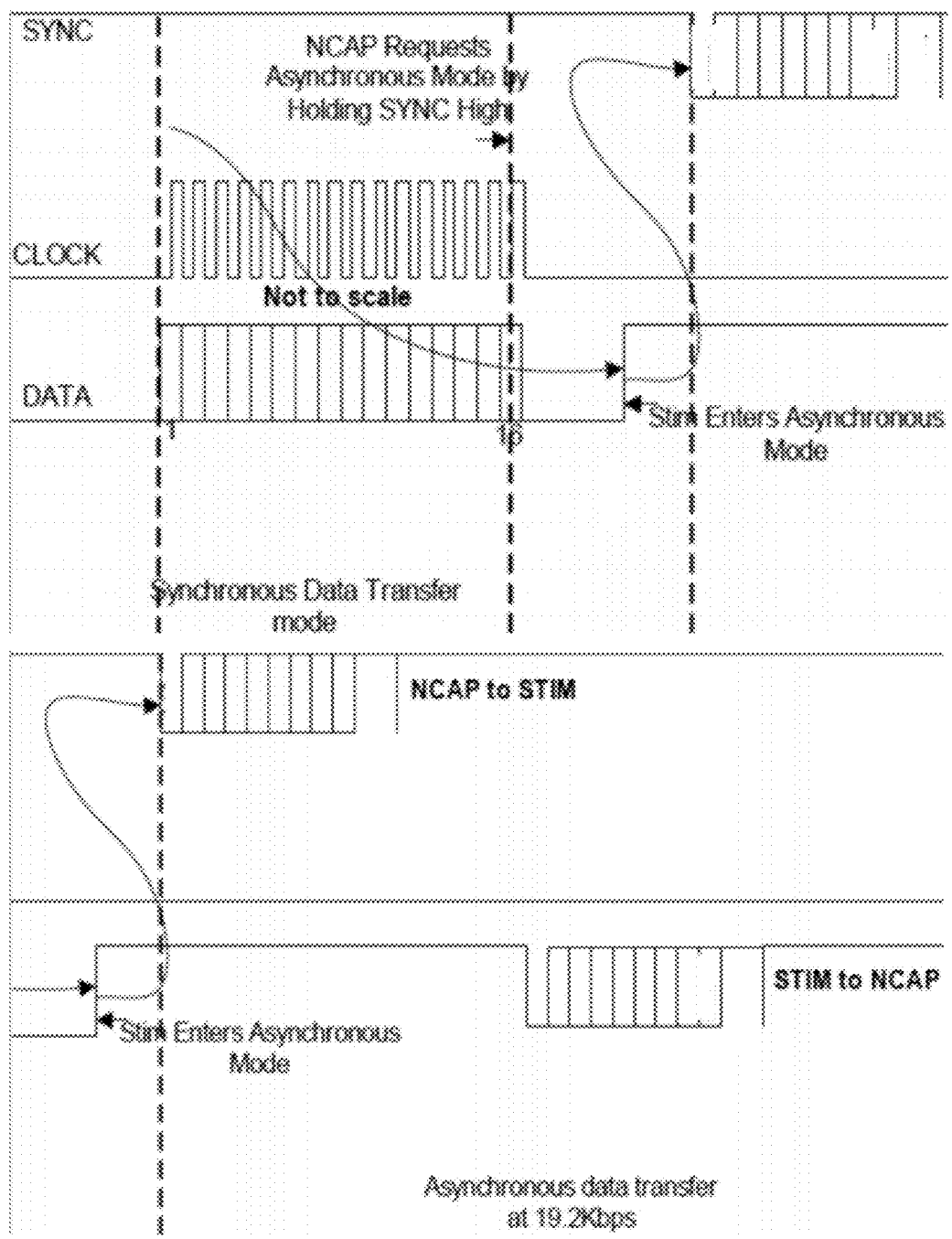
FIG. 10 illustrates an example of a protocol for entering low speed asynchronous to communication mode between a NCAP and a STIM.
Figure 11:
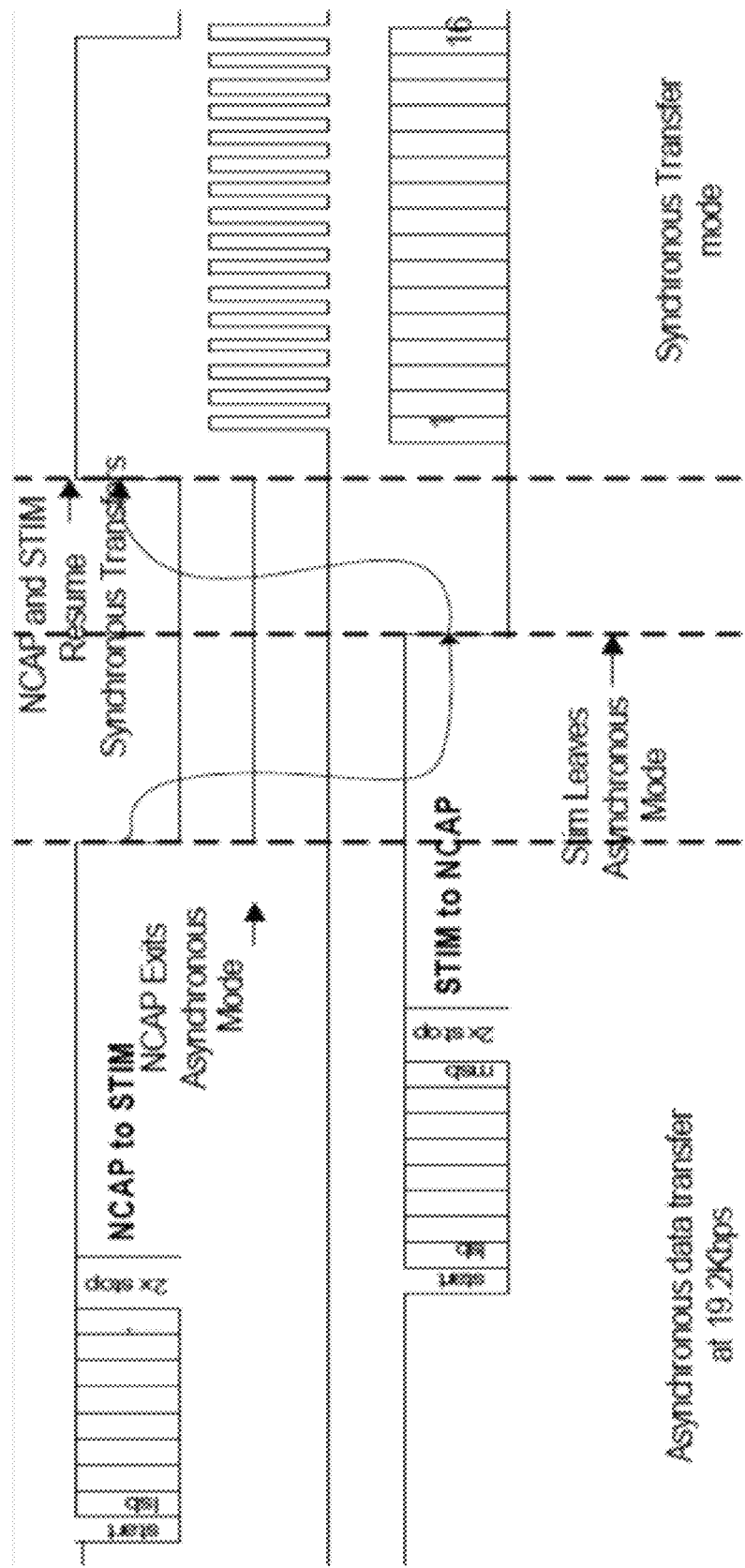
FIG. 11 illustrates an example of a protocol for exiting low speed asynchronous communication mode between a NCAP and a STIM.

The two modes of operation and communication between the NCAP and STIM are high speed synchronous data transfer mode used during testing and low speed asynchronous data transfer mode used for bidirectional communication. In high speed synchronous mode, the NCAP asserts a Sync signal, and the STIM responds by generating an 8 MHz clock signal and 16 bit data is transferred at a rate of up to 100K words per second (FIG. 9). Low speed asynchronous data transfer mode is used during test set up for querying, setting TEDS data, and other "housekeeping" functions and data is transferred at, for example, 19 Kbps. FIG. 10 and FIG. 11 illustrate the protocols for entering and exiting this mode of operation, respectively.

NCAP—Server Interface

Figure 12:
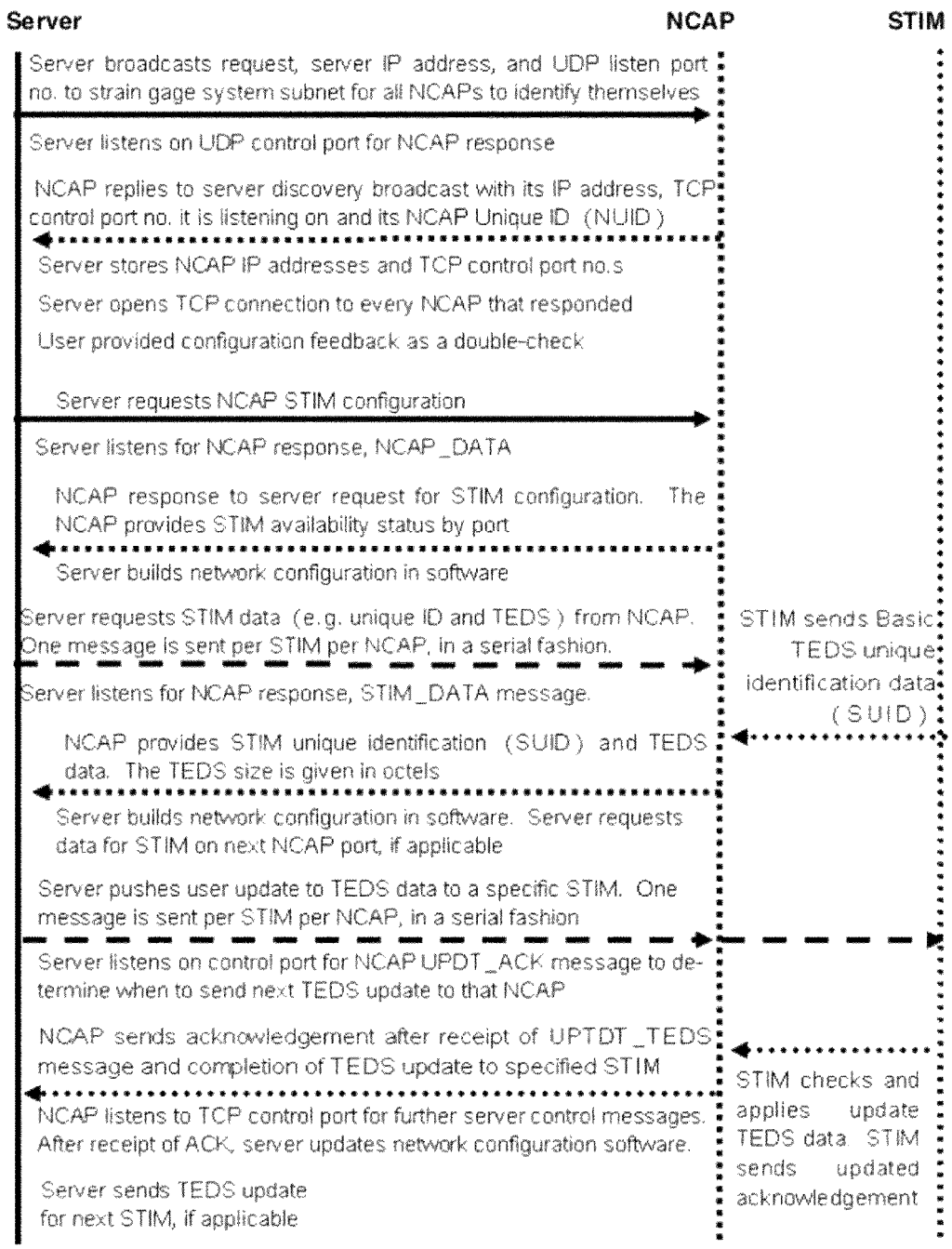
FIG. 12 is a diagram showing an example of communication between a server, an NCAP, and a STIM during Set Up Mode.
Figure 13:
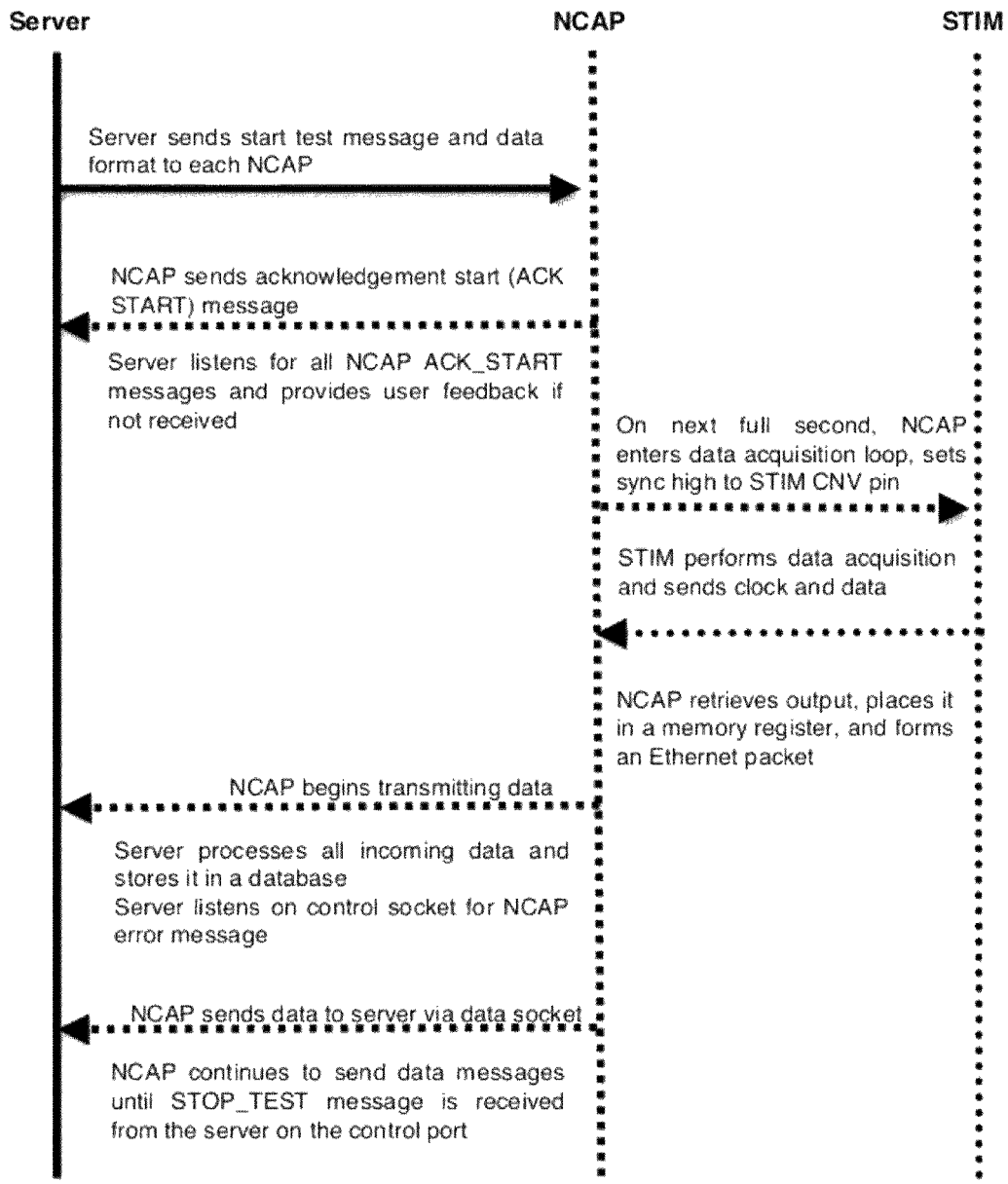
FIG. 13 is a diagram showing an example of communication between a server, an NCAP, and a STIM during Start Test Mode.
Figure 14:
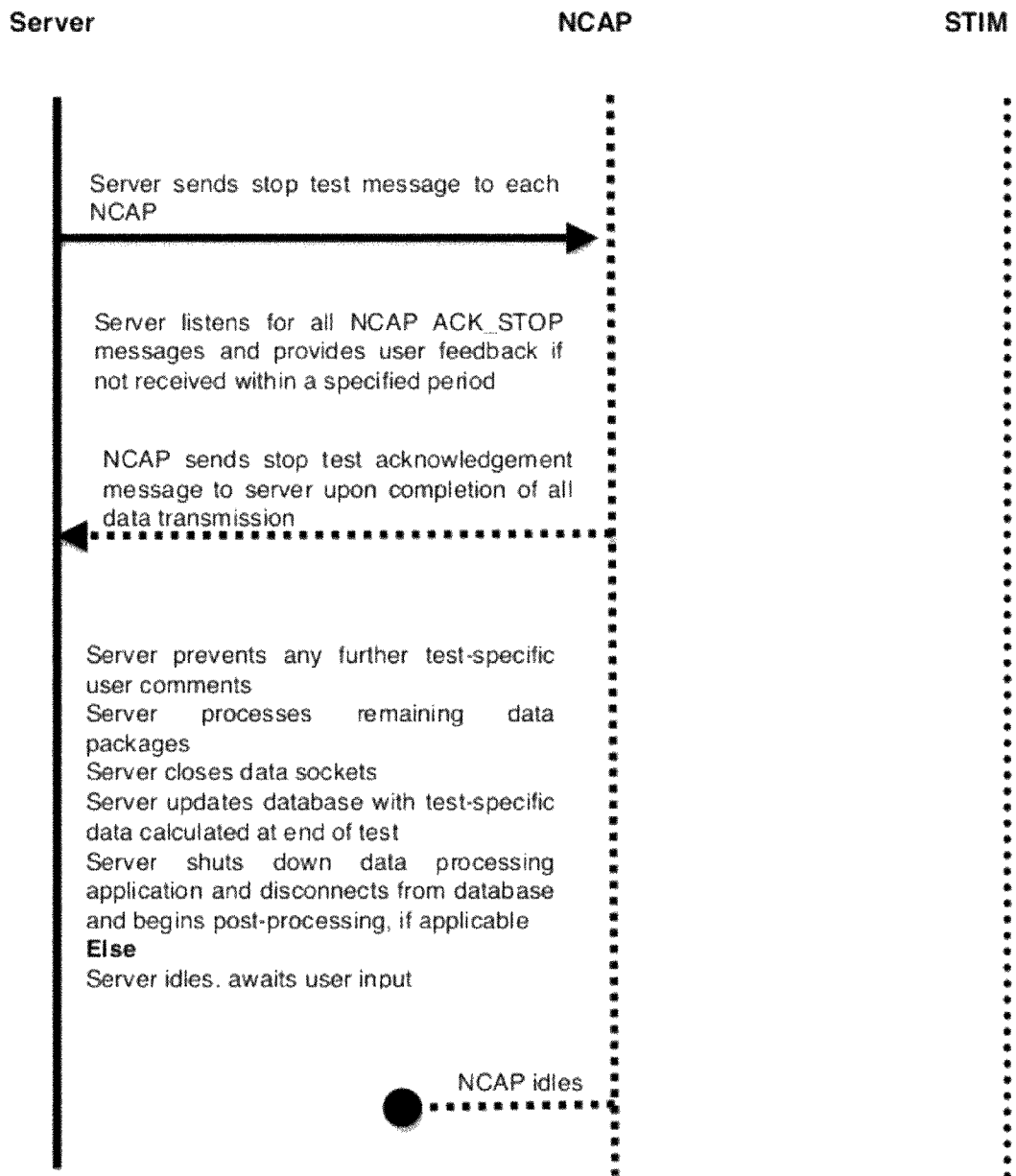
FIG. 14 is a diagram showing an example of communication between a server and an NCAP during Stop Test Mode.

The Server/NCAP interface specification includes the procedure for the server to discover the NCAPs on the network and for them to exchange initial identifying information. It also includes the detailed formats for the messages exchanged between the server and the NCAPs during pre-test set-up, and data messages. It includes the high speed synchronous data transfer mode and the asynchronous message passing mode for set up. FIGS. 12-14 show examples of setup mode, test mode start test, and test mode stop test communication diagrams. FIG. 15 shows an example of an NCAP microprocessor (NCAPuC) communication processes during data acquisition.

The fields in the data file match the message format in the Server interface specification and include message header information, the NCAP data counter, time information (synchronized with the master clock), the STIM existence table, data for 20 STIMs, and a checksum.

A data packet format sent from the NCAP to the server may be arranged as desired by user. As an example, the data packet may be formatted with 800 bits of information per message from each NCAP for each sample as follows:

1×32 bit Start word:
[xDEADBEEF]
1×32 bit NCAP Header:
[NCAP_ID (16)][Mode (8)][NUM_PAYLOAD_WORD (8)]
1×32 bit Time:
[seconds(8)][subseconds(24)]
1×32 bit STIM Status
[Zero(12)][Status Good(20)] (1-20)×32 bit STIM data
[STIM_DATA (32)]
1×32 bit Checksum word
[Zero(24)][Checksum(8)]

The high speed transfer of large volumes of data is preferably monitored to ensure that data sets are complete. A script, for example a Python script, may be used to check the data based on the logic that, if all of the data is present in the file, and "correct" then the difference between the value of the counter fields on consecutive lines will be 1. For example, the value of the NCAP counter on a particular line might be 1101, and the previous line would be 1100. The difference between the value on line N and line N−1 is 1. The only exception to this is when the counter rolls over, in which case the difference will be a large negative number (~−65535 for a 16-bit counter). This is expected, trapped, and the difference reset to 1. The sum of the differences between consecutive counter values should equal the number of lines in the file. If the data is wrong in any way it is very unlikely that the error would still produce a sum of differences that is the same as the number of lines of data in the file.

While the system, apparatus, and method of the high speed sensor data transfer interface have been described in the context of strain gage sensors and strain gage sensor data, it is to be understood that the strain gage sensors may be replaced by one or more of other types of sensors including thermocouples, pressure sensors, chemical sensors, and other sensors producing analog electrical outputs.

What is claimed is:

1. A high speed sensor data transfer interface comprising a Smart Transducer Interface Module (STIM) and a Network Capable Application Processor (NCAP) wherein:
   the STIM comprises a circuit board comprising:
   a) a bridge circuit configured to convert a resistance change of a sensor output into a voltage,
   b) an instrumentation amplifier configured to apply a gain to the voltage,
   c) a first order RC high pass filter having a cut-off frequency and configured such that the cutoff frequency can be varied by changing a value of a resistor and a value of a capacitor in the filter,
   d) a reference power supply,
   e) a Bessel filter having a programmable cutoff frequency,
   f) a high-speed analog to digital converter configured to convert analog input data into digital output data, and
   g) a microprocessor configured to control a data acquisition process, store information about the transducer and analog circuit, and communicate with other processors in the system;
   the NCAP is configured to provide an interface between a data exchange network and the STIM; and
   the NCAP comprises a microprocessor configured to use a precision time protocol and either a Field Programmable Gate Array or a Complex Programmable Logic Device.

2. The high speed sensor data transfer interface of claim 1, wherein the high-speed, analog to digital converter is a discrete component and is configured to communicate digital data through a serial data interface to a processor integrated into the STIM.

3. The high speed sensor data transfer interface of claim 1, wherein the analog to digital converter is directly integrated into the circuit board.

4. The high speed sensor data transfer interface of claim 1, wherein the STIM comprises a plurality of bridge circuits configured to convert a plurality of resistance to changes from a plurality of sensor outputs into a plurality of voltages.

5. The high speed sensor data transfer interface of claim 4, wherein the plurality of sensors comprises a plurality of strain gages.

6. The high speed sensor data transfer interface of claim 5, wherein the plurality of strain gages are configured to measure vibrations in a turbine engine.

7. The high speed sensor data transfer interface of claim 1, wherein the sensor output is from a strain gage, a thermocouple, a chemical sensor, an optical sensor, a motion sensor, a pressure sensor, or other sensor that produces an analog electrical output.

8. The high speed sensor data transfer interface of claim 1, comprising a plurality of STIMs and wherein the NCAP is configured to provide an interface between the data exchange network and the plurality of STIMs.

9. The high speed sensor data transfer interface of claim 8, comprising a plurality of NCAPs and wherein each NCAP is configured to provide an interface between the data exchange network and a plurality of STIMs.

10. The high speed sensor data transfer interface of claim 9, wherein the interface forms at least a portion of an IEEE-1451 compliant, high-throughput multi-channel data acquisition system and the sensors are configured to make turbine engine dynamic strain measurements.

11. The high speed sensor data transfer interface of claim 1, wherein the transfer of data from the STIM to the data exchange network occurs at a rate of at least 10 kHz.

12. The high speed sensor data transfer interface of claim 1, wherein the Bessel filter is an integrated Bessel filter chip with a 4-bit pin selectable cut-off frequency.

13. The high speed sensor data transfer interface of claim 12, wherein the integrated Bessel filter is configured such that the selectable cut-off frequency can be set in 10 kHz increments between 10 kHz and 150 kHz.

14. The high speed sensor data transfer interface of claim 13, wherein the Bessel filter is connected to digital output pins on the STIM microcontroller such that the cut-off frequency is programmable remotely.

15. The high speed sensor data transfer interface of claim 1, wherein the data exchange network is an ethernet network.

16. The high speed sensor data transfer interface of claim 1, wherein the data is exchanged on a network using a communication protocol specified by a LXI standard.

17. The high speed sensor data transfer interface of claim 1, wherein the data is exchanged on a network using a communication protocol specified by an IEEE-1451 standard.

18. A method for collecting and storing sensor data comprising the steps of:
   i) providing a high speed sensor data transfer interface comprising a Smart Transducer Interface Module (STIM) and a Network Capable Application Processor (NCAP) wherein:
   the STIM comprises a circuit board comprising:
   a) a bridge circuit configured to convert a resistance change of a sensor output into a voltage,
   b) an instrumentation amplifier configured to apply a gain to the voltage,
   c) a first order RC high pass filter having a cut-off frequency and configured such that the cutoff frequency can be varied by changing a value of a resistor and a value of a capacitor in the filter,
   d) a reference power supply,
   e) a Bessel filter having a programmable cutoff frequency,
   f) a high-speed analog to digital converter configured to convert analog input data into digital output data, and
   g) a microprocessor configured to control a data acquisition process, store information about the transducer and analog circuit, and communicate with other processors in the system;
   the NCAP is configured to provide an interface between a data exchange network and the STIM; and
   the NCAP comprises a microprocessor configured to use a precision time protocol and either a Field Programmable Gate Array or a Complex Programmable Logic Device;
   ii) providing at least one sensor providing a resistance change as a sensor output to the bridge circuit of the data transfer interface; and
   iii) processing data output from said at least one sensor through the high speed sensor data transfer interface to produce processed data and transferring the processed data to a server in communication with the data exchange network for storage.

* * * * *